United States Patent [19]

Spencer

[11] Patent Number: 4,850,755
[45] Date of Patent: Jul. 25, 1989

[54] NOSE PIECE ADAPTORS FOR MANUAL OR POWER FEED DRILLS

[75] Inventor: Russell Spencer, Preston, United Kingdom

[73] Assignee: British Aerospace plc, London, England

[21] Appl. No.: 176,160

[22] Filed: Mar. 31, 1988

[30] Foreign Application Priority Data

Apr. 3, 1987 [GB] United Kingdom ............. 8708076

[51] Int. Cl.⁴ .............................................. B23B 49/02
[52] U.S. Cl. ....................................... 408/56; 279/1 A;
 279/1 B; 408/57; 408/72 B; 408/241 B
[58] Field of Search ................... 279/1 A, 1 B; 408/56,
 408/57, 59, 72 R, 72 B, 239 A, 115 B, 241 B

[56] References Cited

U.S. PATENT DOCUMENTS

| 3,735,993 | 5/1973 | Seibert | 279/1 B |
| 4,643,621 | 2/1987 | Fuller et al. | 408/57 |
| 4,743,145 | 5/1988 | Hendricks et al. | 408/72 B X |
| 4,770,570 | 9/1988 | Tsui et al. | 408/72 B X |

FOREIGN PATENT DOCUMENTS 248643 3/1926 United Kingdom .
1383203 2/1975 United Kingdom .

Primary Examiner—Steven C. Bishop
Attorney, Agent, or Firm—Kerkam, Stowell, Kondracki & Clarke

[57] ABSTRACT

The invention concerns a nose piece adaptor for a manual or power feed drill. The adaptor has a hollow cylindrical sleeve (11) surrounding the drill bit and having on the outer surface of one end thereof a taper lock (13) for engagement with location studs (17) in a template (16). At its other end the sleeve (11) can be threadedly engaged or integral with the drill. The sleeve (11) has a sprung, quick-release ball (25) lock mechanism for engaging with or disengaging from a peripheral locking groove (26) of a nose piece (14) inserted into the bore of the sleeve (11). The nose piece (14) is a simple cylindrical rod with a bore (30) for the drill bit.

9 Claims, 3 Drawing Sheets

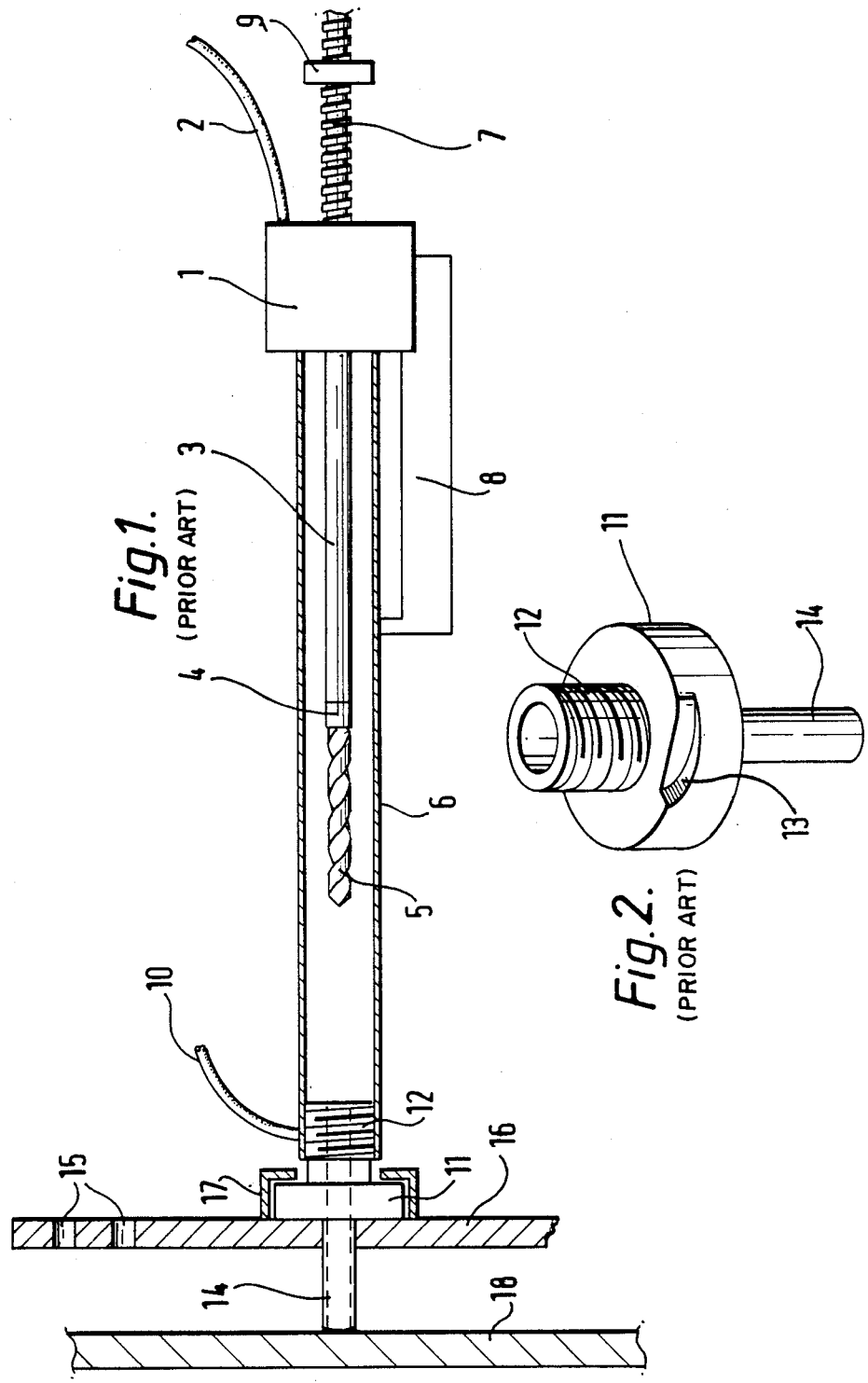

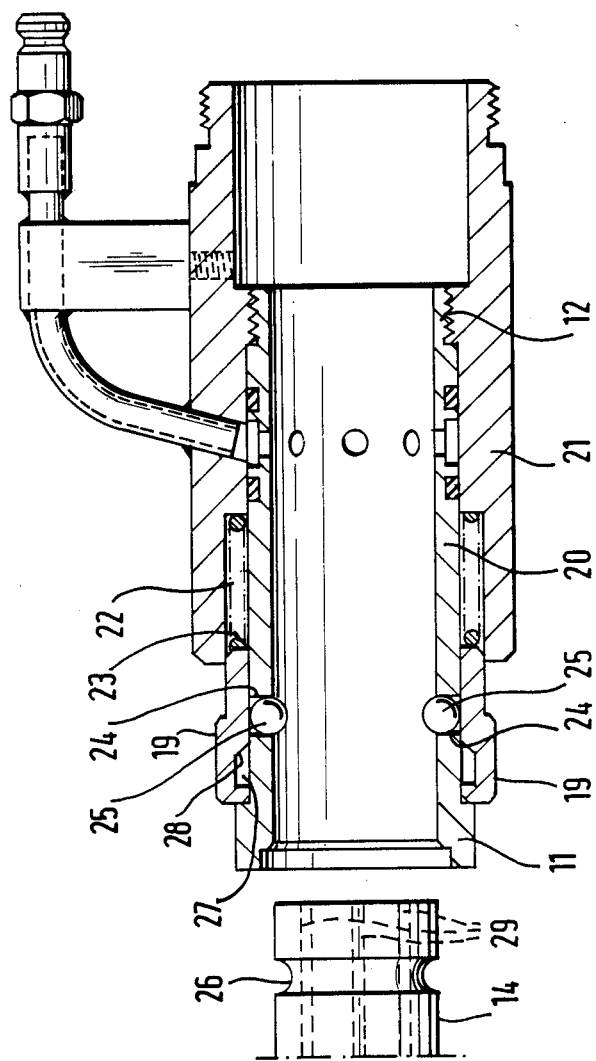

NOSE PIECE ADAPTORS FOR MANUAL OR POWER FEED DRILLS

This invention relates to manual or power feed drills which are preferably portable. More particularly, it concerns detachable nose pieces for such drills for supporting a drill bit in a template during drilling operations.

In the manufacture of complex metal parts, particularly in aircraft manufacture, it is often necessary to drill large numbers of holes of varying sizes and positions in a plurality of identical workpieces of metal or composite materials. These holes are usually drilled by hand-held or taper-locked manual or power feed drills with the aid of a template which enables the drill to be placed at precise positions with respect to each workpiece offered thereto. The template is supported at a fixed distance from the workpiece and has a pattern of holes of the appropriate size made in it at predetermined required locations so that a drill bit can be passed through them to drill the workpiece. It is established practice to use a nose piece bushing to support the drill bit in the template and prevent it from slipping, during drilling, which could otherwise damage the workpiece.

A nose piece bushing (hereafter also referred to simply as a "nose-piece") is typically of tubing of predetermined length which is screwed into the end of a manual or power feed drill and through which the drill bit passes during the course of drilling. The internal diameter of the nose piece is sufficient for the drill bit to be passed axially through the nose piece while at the same time supporting the drill bits around its sides, thus increasing its effective stiffness. The nose piece and drill are screwed to the template by means of a tapered lock which consists of a flange around the nose piece which has been profiled to fit under locking studs. The tapered lock is unitarily constructed with the nose piece and prevents movement of the drill during drilling. Each nose piece/taper lock unit with its thread, usually right-handed, for securing it to the feed drill sleeve is a complex and hence expensive item.

The gaps between the template and workpiece at the various hole locations often vary in length due to workpiece topography and thus different length nose pieces are required as well as nose pieces of different external and internal dimensions. For this reason nose pieces are made interchangeable and do not form a permanent part of the drill sleeve end. In conventional arrangements the nose piece/taper lock unit is screwed into the end of a power feed drill by means of the right-hand thread. Whenever a different length and/or diameter nose piece is required the old one must be unscrewed and a new one screwed back in its place.

It is often necessary to have on hand dozens of such nose piece/taper lock units, each of a different length and/or diameter, for the manufacture of a single aircraft component. Unscrewing one nose piece/taper lock unit and screwing in a new one each time the drill is moved to a location requiring a new hole dimension is difficult and time-consuming because the screw thread is usually made right-handed to prevent the nose piece becoming loose during to rotation of the drill; this often causes confusion when the operator has to change units and he often initially tightens it instead of unscrewing it, adding to the time wasted in preparation as well as presenting a risk of damage. The operator is tempted to solve these problems by preparing in advance a series of dedicated feed drills each with a different size nose piece/taper lock unit attached. Instead of changing nose pieces when required, the drill operator then only has to pick up another feed drill with the required unit already attached to it. Although this method is quick and convenient it is extremely expensive as each drill is an expensive item costing typically 5000.

It is an object of this invention to provide a nose piece/taper lock unit for power feed drills which enables nose piece bushings to be interchanged quickly without the drawbacks of threaded attachment and the expense of tooling.

According to this invention there is provided, in combination, a nose piece adapter for use with a drill and with a template having a plurality of differently sized holes for receiving a nose piece bushing with a drill bit therewithin, the template having location stud means around each said hold, the nose piece adaptor comprising a hollow cylindrical sleeve for attachment to the drill, the sleeve including an internal bore for receiving a said bushing therewithin, locking means on said sleeve displaceable between a locking position in which a said bushing inserted into said bore is lockingly engaged and a release position in which a said bushing is freely insertable into and releasable from said bore, and taper lock means attached to the external surface of one end of said sleeve for locking engagement with the said location stud means of said template, and said bushing is a substantially plain cylindrical rod having a central axial bore for receiving a said drill bit, and nose piece locking means for quick-releasable engagement with said sleeve locking means.

The quick release means for the nose piece may form part of the sleeve of a power or manual feed drill or may be adapted to be secured thereto, e.g. by a screw thread.

Preferred embodiments of the invention will now be described by way of example only, with reference to the following drawings in which:

FIG. 1 is a schematic diagram of a feed drill with a known nose piece attachment;

FIG. 2 is a perspective view on an enlarged scale of the known nose piece attachment of FIG. 1;

FIG. 4 is a sectional view of the adaptor of FIG. 3; and

Figure 3:
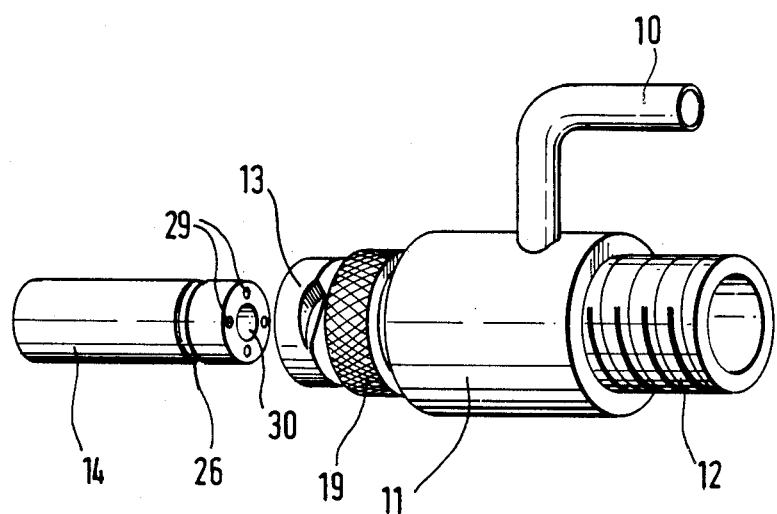
FIG. 3 is a perspective view of the combination of a nose piece bushing and a quick-release nose piece adaptor according to the present invention.

FIG. 1 is a schematic drawing of a typical power feed drill arrangement showing a power unit 1 connected to an external source of pressurised fluid (not shown) via a fluid coupling 2. The power unit drives a shaft 3 which has a chuck 4 and drill bit 5 on one end. The drive shaft and drill bit are contained in an outer housing 6 and can be automatically or manually racked along the inside of the housing in an axial direction by means of a rack assembly 7 and a motor 8 until the drill bit extends from the open end of housing 6. The travel of the drill bit and drive shaft are adjusted within predetermined limits by means of an adjustable stop 9 on the rack assembly 7 which limits movement of the screw. A fluid nozzle 10 enables lubricant to be supplied to the end of the power feed drill, to cool and lubricate the drill bit 5.

Screwed into the open end of the housing 6, on a right-hand thread is a nose piece/taper lock unit. As shown in detail in FIG. 2 the nose piece/taper lock unit comprises a tool head 11 with a threaded portion 12, two or more tapered lock grooves 13 and a nose piece extension also known as bushing 14 which is used for supporting the drill bit during drilling. The nose piece/taper lock and its right-hand thread is of unitary construction and is completely replaced each time a hole of different diameter or distance from a template is to be drilled. Prior to drilling a hole the nose piece is screwed into the end of the power feed drill by the threaded portion 12 and the nose piece 14 is inserted through an appropriate hole 15 in a template 16. The end of the drill is then locked in position by means of the taper lock notches 13 and locking studs 17 on the template. Each hole in the template has its own set of locking studs 17 around its circumference, the locking studs co-operate with the tapered locking grooves 13 of the nose piece assembly to lock the drill in place. To effect locking, the drill is simply placed in a hole and rotated until the tapered locking grooves 13 abut against the locking studs. The feed drill is then operated and motor 8 automatically racks the drill bit along until it passes the rotating bit through the end of the nose piece and into the workpiece 18. An appropriate length of nose piece supports the drill bit along most of its length between the template and workpiece to a point just short of the workpiece surface. A small gap between the nose piece and workpiece enables swarf to be expelled by the drill bit without clogging up.

The new arrangement shown in FIG. 3 includes the tapered lock grooves 13 and threaded portion 12 described before, but an important difference is that the nose piece bushing is not unitary with the taper lock: rather, it is engageable with and disengageable from the taper lock by a quick-release mechanism which includes a locking collar 19 as an actuator for the quick release mechanism to be operated for removal and replacement of separate nose pieces. Similar quick release mechanisms are already known from e.g. G.B. Patent No. 1,383,203 but a brief description of such a quick release mechanism will now be described specifically with regard to its use in the present invention.

Referring to FIG. 4, the release mechanism comprises an inner portion 20 screwed into an outer portion 21 so as to define therebetween a circumferential cavity 22 in which a coiled spring 23 is mounted and into which part of the locking collar 19 may slide The coiled spring 23 acts as a return spring on the locking collar 19. The inner portion 20 has tapered holes 24 through its sides in which two or more balls 25 are mounted. The dimensions of the holes 24 are such that the balls 25 may protrude part of the way inside the tool head 11 when the collar 19 is in its forward or locking position shown in FIG. 4 to lock the nose piece bushing 14, by engaging in a locking groove 26 around the circumference of the nose piece bushing 14. Locking collar 19 also has a circumferential groove 27 around its inner surface in which the balls 25 are received when the collar 19 is in a release position.

The locking collar 19 is slid axially into the release position against the action of the coiled spring 23 until the groove 27 is aligned with the ball bearings 25. In this release position the groove 27 allows a limited amount of transverse movement of the balls, sufficient to permit them to be pushed flush against the inside surface of inner portion 20 of tool head 11. When nose piece 14 is inserted into the drill it displaces the ball bearings 25 radially outwards as it slides freely into position. When the nose piece 14 has been placed in position, the locking collar 19 is released and moves back under the action of coiled spring 23. When in the locked position, bevelled edges 28 on the locking collar groove 27 push the balls 25 radially inwards into the circumferential locking groove 26 at one end of the nose piece 14 to grip the nose piece.

The nose piece 14 is shown as having a number of small bores 29 extending axially through the drill bit with coolant and lubricant. Coolant and lubricant are pumped from a reservoir (not shown) through the bores 29 via fluid coupling 10, from where in use the lubricant runs from the end of the nose piece and onto the drill bit.

In use, the present arrangement of tapered lock and nose piece adaptor is screwed into the end of a power feed drill and left on as a semi-permanent feature. It is necessary only to replace hose pieces bushings to permit drilling of holes of different diameter or distance from the template. Accordingly, the nose piece bushings are of simple cylindrical shape, easier and cheaper to make than the conventional nose piece/taper lock units. Moreover, replacement is a simple, speedy operation by virtue of the quick-release mechanism. To attach a nose piece bushing the locking sleeve 19 is simply pushed into an unlocked position and a cylindrical nose piece 14 is pushed inside until the groove 26 on the nose piece 14 is aligned with the balls 25, the locking sleeve 19 is then released and moves, under spring action, into a locked position to hold the nose piece 14 in place. By comparison, in prior arrangements a whole tapered lock and nose piece assembly such as is shown in FIG. 2 is screwed on and off the end of the power feed drill during interchange, increasing the time required for an interchange and multiplying the expense.

Figure 5:
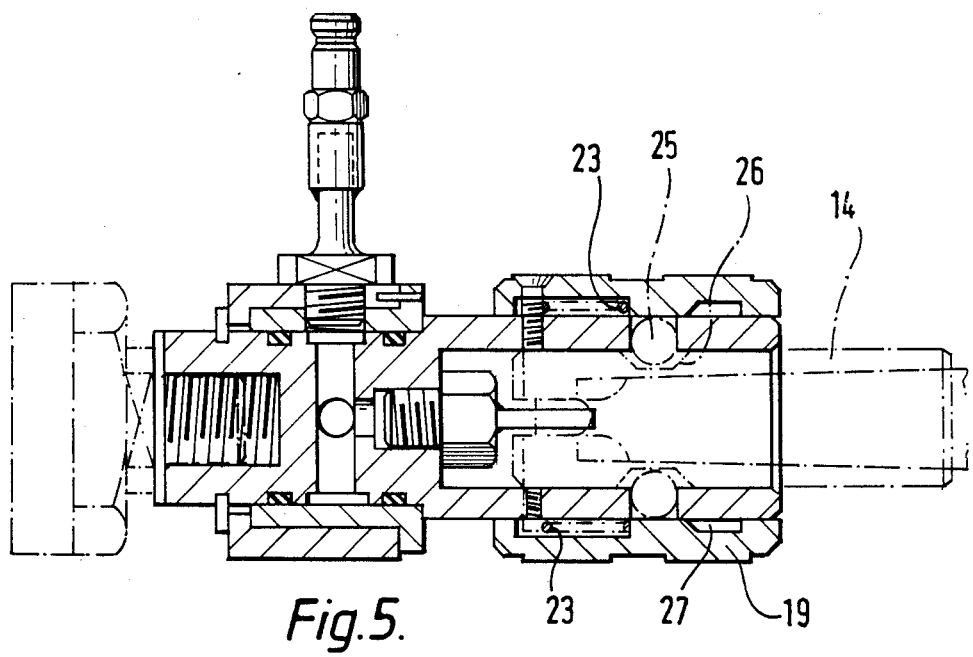
FIG. 5 is a sectional view of a quick-release chuck mechanism.

FIG. 5 shows a quick-release mechanism for use on the chuck of a power feed drill. Operation of the quick-release mechanism is the same as that just described except that it is used to attach a drill bit to the power feed drill.

Embodiments of the invention other than what has been described are possible without departing from the scope of the invention. For instance, a nose piece bushing can be modified to be adjustable in length. This may be achieved by having a series of coaxial locking grooves at different locations along the nose piece instead of a single locking groove. The nose piece can be made to protrude at different lengths from the end of the power feed drill by releasing the quick-release mechanism and by sliding the nose piece in and out of the drill and then releasing the quick-release mechanism to engage the appropriate locking groove. In another alternative arrangement, the taper lock and quick-release mechanism are made as part of the power feed drill and not as a separate adaptor.

The quick-release mechanism need also not be limited to the ball arrangement shown and more than two balls could be used or perhaps even a different type of locking arrangement.

What is claimed is:

1. In combination, a nose piece adaptor for use with a drill and with a template having a plurality of differently sized holes for receiving a nose piece bushing with a drill bit therewithin, the template having location stud means around each said hole, the nose piece adaptor comprising:
   a hollow cylindrical sleeve for attachment to the drill, the sleeve including an internal bore for receiving a said bushing therewithin, locking means on said sleeve displaceable between a locking position in which a said bushing inserted into said bore is lockingly engaged and a release position in which a said bushing is freely insertable into and releasable from said bore;

taper lock means attached to the external surface of one end of said sleeve for locking engagement with the said location stud means of said template; and said bushing is a substantially plain cylindrical rod having a central axial bore for receiving a said drill bit, and nose piece locking means for quick-releasable engagement with said sleeve locking means.

2. The combination according to claim 1, wherein the said sleeve includes an actuator for effecting the displacement of said locking means between the locking and release positions of the latter, and resilient biasing means for biasing the actuator towards its locking position.

3. The combination according to claim1, wherein the said locking means includes at least one ball movably mounted in apertures formed in the sides of the said sleeve and adapted lockingly to engage in a groove formed in said bushing nose piece in said locking position.

4. The combination according to claim 3, wherein said actuator is a collar axially movable between two positions with respect to the said sleeve, and an internal circumferential groove formed in said actuator is so configured that in one position the said at least one ball is driven radially inwardly by the collar into locking engagement with a bushing groove formed in a said bushing inserted into the said sleeve and in another position of the collar the said circumferential groove is aligned with the said at least one ball to allow sufficient movement of the ball radially outwardly from the bushing so as to release a said bushing.

5. The combination according to claim 4, wherein the resilient means is a helical spring arranged to bias the collar towards its locking position.

6. The combination according to claim 1, wherein the other end of said sleeve is provided with screw threads for attachment to the drill.

7. The combination according to claim 1, wherein said sleeve locking means includes male means and said nose piece locking means includes at least one circumferential groove for receiving said male means.

8. The combination according to claim 1, wherein the said bushing is one of a set of like bushings of differing diameter.

9. In combination, a nose piece adaptor for use with a drill and with a template having a plurality of differently sized holes for receiving a nose piece bushing with a drill bit therewithin, the template having location stud means around each said hole, the nose piece adaptor comprising:

a hollow cylindrical sleeve for attachment to the drill, the sleeve including an internal bore for receiving a said bushing therewithin, locking means on said sleeve displaceable between a locking position in which a said bushing inserted into said bore is lockingly engaged and a release position in which a said bushing is freely insertable into and releasable from said bore, taper lock means attached to the external surface of one end of said sleeve for locking engagement with the said location stud means of said template; and said bushing forming part of a set of nose piece bushings of substantially identical configuration but differing diameters, each of the bushings of the set being an elongated cylindrical rod, a central bore formed in said rod for receiving a said drill bit, and lubricant bores extending along said rod from one axial end thereof to the other axial end thereof, and at least one external circumferential groove formed in said rod to receive at least one locking member forming part of the locking means of said sleeve.

* * * * *

UNITED STATES PATENT AND TRADEMARK OFFICE
CERTIFICATE OF CORRECTION

PATENT NO. : 4,850,755
DATED : July 25, 1989
INVENTOR(S) : Russell Spencer

It is certified that error appears in the above-identified patent and that said Letters Patent is hereby corrected as shown below:

In Col. 5, claim 3 line 24 delete "nose piece".

Signed and Sealed this

First Day of January, 1991

Attest:

HARRY F. MANBECK, JR.

Attesting Officer

Commissioner of Patents and Trademarks